Patented May 5, 1953

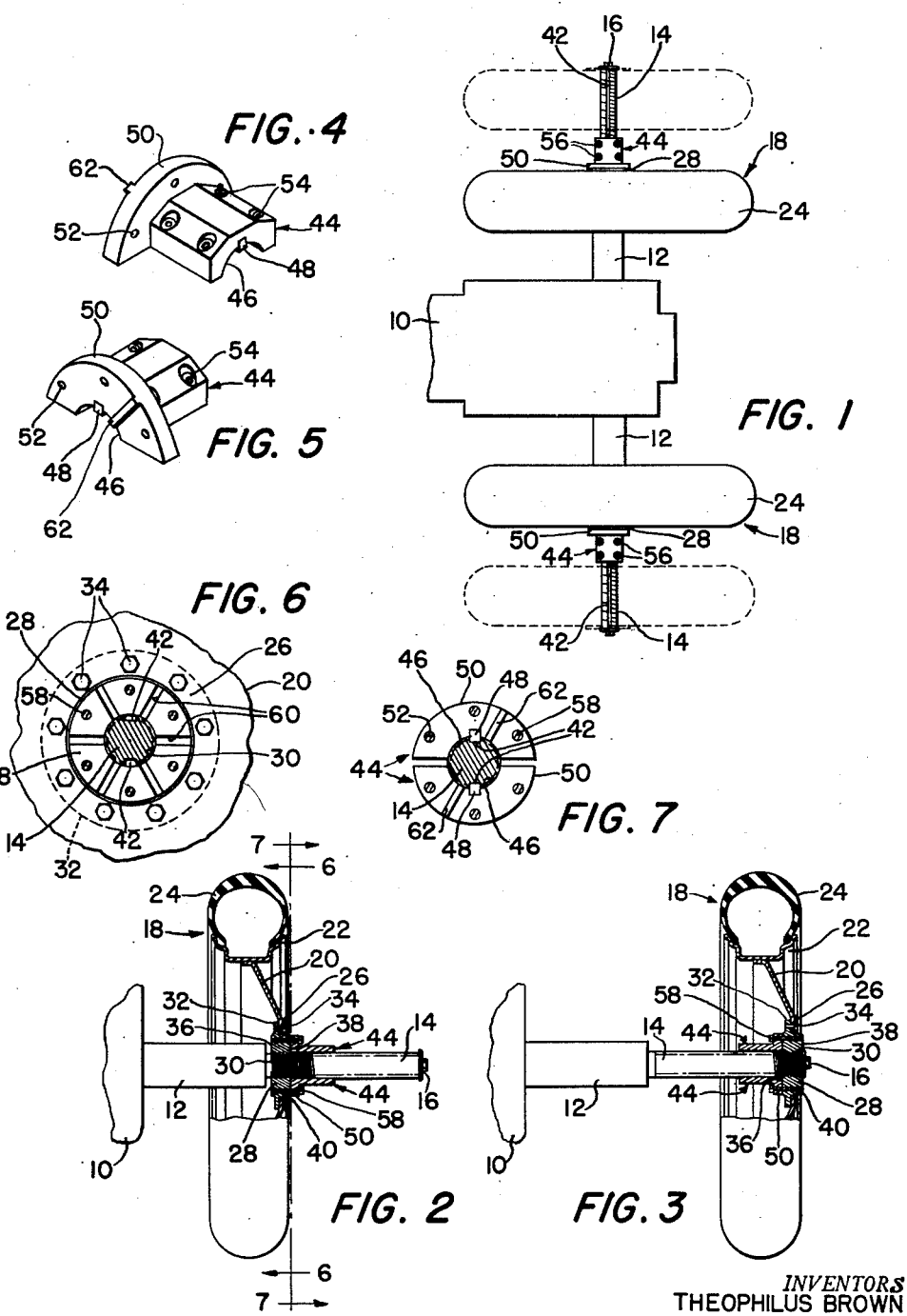

2,637,598

UNITED STATES PATENT OFFICE 2,637,598

ADJUSTABLE WHEEL AND AXLE ASSEMBLY FOR VARIABLE TREAD VEHICLES

Theophilus Brown and George Ickes, Moline, Ill., assignors to Deere & Company, Moline, Ill., a corporation of Illinois Application November 12, 1949, Serial No. 126,866

10 Claims. (Cl. 301—1)

This invention relates to a wheel assembly and more particularly to such assembly for use in obtaining wheel tread variation in agricultural tractors or like vehicles.

A typical agricultural tractor has a longitudinal body provided with a pair of transversely extending axle housings, one on each side of the body, and from each of which extends an elongated axle having an outer end disposed in spaced relation to the proximate side of the body. Each axle carries thereon a relatively large traction wheel. In view of the fact that a tractor of this type is used for a large number of farming operations, provision is made for lateral adjustability of the traction wheels so that the tread or lateral spacing therebetween may be varied. For example, in plowing, the traction wheels should be set relatively close together, whereas in cultivating, the wheels should be relatively widely spaced. For this purpose, the conventional agricultural tractor has its axles splined or provided with keyways and the hubs of the tractions wheels are respectively equipped with clamping or locking means which may be loosened or tightened to facilitate axial shifting of the wheels relative to the axles.

In the conventional tractor, shifting of the wheels to obtain tread variation is an onerous task at best, since the wheels are heavy and often become "frozen" to the axles. Further, in order that a relatively wide tread variation may be obtained without materially increasing the length of the axles, it is standard practice to design a wheel in which the hub is offset axially from the median plane of the wheel body which is in turn offset axially from the median plane of the rim and tire. Hence, the wheel may be reversed on the axle to accomplish tread variation within a certain range and the tire and rim may be reversed on the wheel body to accomplish further tread variation in another range. The combination of reversibility of the wheel components and slidability of the wheel on the axle has heretofore given acceptable results. Nevertheless, there is considerable room for improvement in the design and arrangement outlined above.

As an expedient in facilitating the adjustment of tractor wheels for the purposes indicated, there have been heretofore proposed screw-threaded connections between the tractor wheels and the tractor, such as in U. S. Patent 1,967,283 to Brown. A further improvement in which the threaded connection is provided between the wheel and axle is disclosed in the U. S. Patent 2,099,194 to Brown. In either of these instances, or in any obvious modifications thereof, tread variation is accomplished by power derived from the tractor; that is, torque transmitted by the engine is delivered through the differential to one axle while the tractor brake is applied to the other; or, alternatively, the tractor may be driven forwardly with the locking means released between the wheel and axle so that the two may rotate relatively. During normal operation, the locking means are set so that the wheels are constrained for rotation with the axles.

In cases such as those mentioned above, a considerable problem is involved in designing an efficient and commercially acceptable locking means for releasably securing the wheel to the axle. In the U. S. Patent 2,472,742 to Brown, there is disclosed and claimed one form of locking means involving a threaded hub on the wheel and a keyed or splined cap releasably connectible to the hub. The present invention is an improvement over the arrangements heretofore known, including those in the patents identified above, and has for its principal object the provision of improved locking means which will function in such a manner as to give increased tread variation without requiring reversibility of the wheels. In the accomplishment of this object, I provide the locking means in the form of a plurality of complementary segmental members arranged to be grouped about the axle for releasably embracing the axle, one of the members having a spline or keyway therein to engage a spline or keyway in the axle. The hub of the wheel is internally threaded to mate with the external threads on the axle. The grouped locking members are releasably securable to the hub and, because the locking members are radially separable, they may be removed from one side of the wheel and replaced at the other side, so that they may be arranged at the outside of the wheel when the wheel is close to the tractor body and at the inside of the wheel when the wheel is at the outer end of the axle or remote from the tractor body.

Another object of the invention is to provide locking means that are simple in design and construction, and that may be easily used and readily adapted to existing wheels of certain known types.

The foregoing and other important objects and desirable features inherent and encompassed by the invention will become apparent as a detailed disclosure of a preferred embodiment of the invention is made in the following description and accompanying sheet of drawings, in which Figure 1 is a plan view of the rear portion of a tractor showing in full lines a narrow tread disposition of the wheels and in dotted lines a wide tread disposition of the wheels;

Figure 2 is an enlarged view of one of the wheels, partly in section, showing it in its narrow tread position;

Figure 3 is a similar view showing one of the wheels in its wide tread position;

Figures 4 and 5 are perspective views of one of the segmental locking members;

Figure 6 is a fragmentary face view, partly in section as viewed along the line 6—6 of Figure 2; and Figure 7 is a face view, partly in section as viewed along the line 7—7 of Figure 2.

The tractor chosen for the purposes of illustration has a longitudinal body 10 provided with opposite, transversely outwardly extending axle housings 12 within each of which is journaled an elongated, rotatable, externally threaded axle 14. Each axle is relatively long so that its outer end is somewhat remote from the proximate side of the body 10. A conventional stop 16 may be provided at its outer end for purposes to presently appear.

The tractor is provided with a pair of traction wheels 18 which are carried respectively on the axles 14. Since the wheels are identical, only one will be described.

Each wheel comprises a central wheel body 20 surrounded by a rim 22 which may carry a pneumatic tire 24. The wheel body 20 is dished so that it has a mounting portion 26 axially offset with respect to the median plane of the tire and rim.

Each wheel includes a hub 28 which has a centrally apertured, internally threaded opening 30 to provide a bearing surface or area by means of which the hub may at times be rotated relative to the axle 14. The internal threads at 30 mate with the external threads of the axle so that rotation of the wheel selectively in one direction or the other effects axial movement of the hub toward or away from the outer end of the axle. If the threads were omitted and the axle and hub provided with complementary bearing surfaces, rotation of the wheel relative to the axle would still be possible, although axial shifting of the wheel relative to the axle would not be incident to rotation of the wheel relative to the axle. In either case, as will be hereinafter brought out, the principles of the present invention apply.

The hub 30 has an external radial flange 32 which provides means for cooperation with the wheel body portion 26 to carry the wheel 18. A plurality of bolts 34 may be used to interconnect the portions 26 and 32. The hub further has an inner radial mounting face 36 and an outer mounting face 38. A plurality of angularly spaced bolt holes or tapped bores 40 is provided on a circle about the axis of the hub. These bolt holes open or are available at both radial faces 36 and 38.

The axle 14 is preferably provided with a pair of diametrically opposed external keyways or splines 42 running lengthwise thereof. The hub is not splined and, as stated above, is at times freely rotatable relative to the axle 14. In those instances in which the axle and hub are respectively externally and internally threaded, axial adjustment of the wheel on the axle may be effected by rotating the wheel, thus effecting axial propulsion of the wheel in one direction or the other, depending upon the direction of rotation of the wheel. Whether relative rotation between the wheel and axle is accomplished manually or by power of the tractor is immaterial in the present case.

The improved means provided by the present invention for the purpose of locking the wheel 18 to the axle 14 so that the two are constrained for rotation together comprises, in its preferred embodiment, a group—here a pair—of complementary segmental members 44. Since these members are preferably identical, only one will be described. Two different views of one of the members appear in Figures 4 and 5. Figure 7 illustrates the assembled relationship of the members 44 when disposed to embrace the axle 14, each member being internally arcuate in form as at 46 to surround or receive the axle. The interior surface at 46 is smooth and unthreaded and is interrupted only by the provision of means providing a longitudinal key 48. This key fits and is slidable lengthwise in one of the keyways 42 in the axle 14. When the members 44 are assembled as in Figure 7, the keys 48 are diametrically opposed and thus are respectively received in the diametrically opposed keyways 42.

Each member 44 is provided at one end thereof with a radial portion 50, and these portions, when the members are assembled about the axle, provide a radial face adapted selectively to abut either of the radial mounting faces 36 or 38 of the hub 28. Each radial portion 50 is provided with a plurality of angularly spaced bolt holes 52 on such circle and of such angular spacing as to be registrable with the circle of bolt holes 40 in the hub 28. Since the members 44 are radially separable with respect to each other and with respect to the axle 14, they may be installed on the axle at either side of the hub 28, with the radial face provided by the portion 50 in abutting relationship selectively to either the radial mounting face 36 or the radial mounting face 38 of the hub. Each member 44 is provided with a plurality of bolt holes 54 which receive a plurality of bolts 56 (Figure 1), which bolts serve as means for securely though releasably clamping the members 44 together about the axle 14.

The registered bolt holes 40 and 52 receive a plurality of bolts 58 for rigidly though releasably securing the members 44 to one or the other of the hub faces 36 or 38, depending upon the position of the wheel. That is to say, when the wheel is in the position shown in Figure 2, the members 44 are secured to the outer mounting face 38. The members are secured to the inner mounting face 36 when the wheel is in the position of Figure 3.

As best shown in Figure 6, the radial face 38 may be provided with a plurality of diametrically alined drive portions 60 which are here shown as radial recesses. The opposite flange 36 may be similarly constructed. Each of the members 44 has thereon a radial drive portion in the form of a lug 62. When the members are assembled as in Figure 7, the lugs 62 are diametrically alined, and the arrangement is such that the lugs 62 interfit with or are received by a selected pair of diametrically alined recesses or portions 60 in whichever flange the members 44 are associated with. These drive portions function to take the strain off the securing means comprising the plurality of bolts 58.

The key 42 in each member 44 may be integrally formed with the body of the member or may be separately constructed and secured to the member. This is a matter of choice and therefore has not been illustrated or described in detail.

Inasmuch as the locking members 44 are positionable at either side of the hub 28, the wheel may be adjusted through a maximum range without requiring the reversibility thereof. In Figure 2, the wheel 18 is as close to the end of the axle housing 12 as is necessary for a plowing operation, for example. In this position, the members 44 are outside the hub 28. It will be readily seen that if the members 44 were permanently connected to the wheel body 20, the same result would be obtained. Yet, the permanent connection of the members 44 to the wheel body 20 would make it impossible to achieve the position of Figure 3, since the increase in tread variation would be diminished by the length of the members 44, since these members would occupy the outermost portion of the axle. However, since the members 44 may be radially separated from the axle and axially separated from the hub, they may be reassembled at the inside of the wheel, thus allowing the wheel to be moved outwardly an additional distance equal to the length of the members 44. The stop 16 at the outer end of the axle serves to prevent accidental axial movement of the wheel completely off the axle.

As stated above, the present disclosure is based upon a preferred embodiment of the invention. Specific features and objects of the invention not enumerated herein will undoubtedly occur to those skilled in the art, as likewise will numerous modifications and alterations in the disclosed arrangement, all of which may be achieved without departing from the spirit and scope of the invention, as defined in the appended claims.

What is claimed is:

1. An adjustable wheel and axle assembly for use in obtaining wheel tread variation in agricultural tractors and like vehicles, comprising: an elongated, externally threaded axle having an outer end and provided with an external keyway running lengthwise thereof to said end and intersecting the threads; a wheel on the axle, including a hub having a central opening provided with internal threads mating with the external threads of the axle so that rotation of the wheel and hub selectively in one direction or the other relative to the axle effects axial adjustment of the wheel and hub respectively toward or away from the outer end of the axle, said hub having inner and outer radial faces and further having a circle of angularly spaced bolt holes therethrough opening at said faces; a pair of complementary, radially separable members of internally recessed form to embrace the axle adjacent the hub at either side of the hub, at least one of said members having an internal key fitting and slidable lengthwise in the axle keyway, said members having radial portions which, when the members are assembled to embrace the axle, provide a radial face adapted to abut selectively either the inner or outer radial face of the hub, said radial portions of the members being provided with bolt holes on a circle and so spaced angularly as to be registrable with the bolt holes in the hub; releasable means connectible between the members for securely though removably clamping the members together about the axle to constrain the members and axle for rotation together; and a plurality of bolts receivable by the registered bolt holes for rigidly though removably securing the members selectively to either radial face of the hub.

2. The invention defined in claim 1, further characterized in that: there is a second keyway in the axle diametrically opposed to the first keyway; and the other of the pair of members has a key fitting the second keyway.

3. The invention defined in claim 1, further characterized in that: each radial face of the hub is provided with a pair of diametrically alined drive portions; and each of the members has a drive portion on its radial portion, said member drive portions being diametrically alined when the members are assembled about the axle and interfittingly engageable with the hub drive portions at the selected radial face.

4. An adjustable wheel and axle assembly for use in obtaining wheel tread variation in agricultural tractors and like vehicles, comprising: an elongated axle having an outer end and provided with an external keyway running lengthwise thereof to said end; a wheel on the axle including a hub having a central opening providing a bearing surface on the axle so that the wheel and hub may at times be rotated relative to the axle, said hub having inner and outer radial faces and further having a circle of angularly spaced bolt holes therethrough opening at said faces; a pair of complementary, radially separable members of internally recessed form to embrace the axle adjacent the hub at either side of the hub, at least one of said members having an internal key fitting and slidable lengthwise in the axle keyway, said members having radial portions which, when the members are assembled to embrace the axle, provide a radial face adapted to abut selectively either the inner or outer radial face of the hub, said radial portions of the members being provided with bolt holes on a circle and so spaced angularly as to be registrable with the bolt holes in the hub; releasable means connectable between the members for securely though removably clamping the members together about the axle to constrain the members and axle for rotation together; and a plurality of bolts receivable by the registered bolt holes for rigidly though removably securing the members selectively to either radial face of the hub.

5. An adjustable wheel and axle assembly for use in obtaining wheel tread variation in agricultural tractors and like vehicles, comprising: an elongated, externally threaded axle having an outer end and provided with an external keyway running lengthwise thereof to said end and intersecting the threads; a wheel on the axle, including a hub having a central opening provided with internal threads mating with the external threads of the axle so that rotation of the wheel and hub selectively in one direction or the other relative to the axle effects axial adjustment of the wheel and hub respectively toward or away from the outer end of the axle, said hub having inner and outer radial mounting faces; a group of complementary, radially separable members of internally recessed form to embrace the axle adjacent the hub at either side of the hub, at least one of said members having an internal key fitting and slidable lengthwise in the axle keyway, said members having radial portions which, when the members are assembled to embrace the axle, provide a radial mounting face adapted to abut selectively either the inner or outer radial face of the hub; releasable means connectable between the members for securely though removably clamping the members together about the axle to constrain the members and axle for rotation together; and second releasable means connectable between the members and the hub for rigidly though removably securing the members selectively to either radial face of the hub.

6. An adjustable wheel and axle assembly for use in obtaining wheel tread variation in agricultural tractors and like vehicles, comprising: an elongated axle having an outer end and provided with an external keyway running lengthwise thereof to said end; a wheel on the axle, including a hub having a central opening providing a bearing surface on the axle so that the wheel and hub may at times be rotated relative to the axle, said hub having inner and outer radial mounting faces; a group of complementary, radially separable members of internally recessed form to embrace the axle adjacent the hub at either side of the hub, at least one of said members having an internal key fitting and slidable lengthwise in the axle keyway, said members having radial portions which, when the members are assembled to embrace the axle, provide a radial mounting face adapted to abut selectively either the inner or outer radial face of the hub; releasable means connectible between the members for securely though removably clamping the members together about the axle to constrain the members and axle for rotation together; and second releasable means connectible between the members and the hub for rigidly though removably securing the members selectively to either radial face of the hub.

7. For use with an agricultural tractor or like vehicle having a longitudinal body provided with a transverse, elongated, externally threaded axle which has an outer end spaced from the body and which further has an external keyway running lengthwise thereof: a wheel hub assembly, comprising a hub member having external means thereon for carrying a wheel and further having a central opening provided with internal threads complementary to the axle threads so that the hub may be rotated on the axle to effect axial movement of the hub selectively toward or away from the outer end of the axle, said hub having inner and outer radial mounting faces apart from the aforesaid wheel-carrying means and further having a circle of angularly spaced bolt holes therethrough opening at said faces; a pair of complementary, radially separable members of internally recessed form positionable selectively at either mounting face of the hub and constructed to embrace the axle, at least one of said members having an internal key receivable by and slidable lengthwise in the axle keyway, said members having radial portions which, when the members are assembled to embrace the axle, provide a radial face adapted to abut selectively either the inner or outer radial face of the hub, said radial portions of the members being provided with bolt holes on a circle and so spaced angularly as to be registrable with the bolt holes in the hub; releasable means for securely though removably clamping the members together about the axle to constrain the members and axle for rotation together; and a plurality of bolts receivable by the registered bolt holes for rigidly though removably securing the members selectively to either radial face of the hub.

8. For use with an agricultural tractor or like vehicle having a longitudinal body provided with a transverse, elongated axle which has an outer end spaced from the body and which further has an external keyway running lengthwise thereof: a wheel hub assembly, comprising a hub member having external means thereon for carrying a wheel and further having a central opening providing a bearing surface by means of which the hub may be rotatably mounted on and axially shiftable relative to the axle selectively toward or away from the outer end of the axle, said hub having inner and outer radial mounting faces apart from the aforesaid wheel-carrying means and further having a circle of angularly spaced bolt holes therethrough opening at said faces; a pair of complementary, radially separable members of internally recessed form positionable selectively at either mounting face of the hub and constructed to embrace the axle, at least one of said members having an internal key receivable by and slidable lengthwise in the axle keyway, said members having radial portions which, when the members are assembled to embrace the axle, provide a radial face adapted to abut selectively either the inner or outer radial face of the hub, said radial portions of the members being provided with bolt holes on a circle and so spaced angularly as to be registrable with the bolt holes in the hub; releasable means cooperative between the members for securely though removably clamping the members together about the axle to constrain the members and axle for rotation together; and a plurality of bolts receivable by the registered bolt holes for rigidly though removably securing the members selectively to either radial face of the hub.

9. For use with an agricultural tractor or like vehicle having a longitudinal body provided with a transverse, elongated, externally threaded axle which has an outer end spaced from the body and which further has an external keyway running lengthwise thereof: a wheel hub assembly, comprising a hub member having external means thereon for carrying a wheel and further having a central opening provided with internal threads complementary to the axle threads so that the hub may be rotated on the axle to effect axial movement of the hub selectively toward or away from the outer end of the axle, said hub having inner and outer radial mounting faces apart from the aforesaid wheel-carrying means; a pair of complementary, radially separable members of internally recessed form positionable selectively at either mounting face of the hub and constructed to embrace the axle, at least one of said members having an internal key receivable by and slidable lengthwise in the axle keyway, said members having radial portions which, when the members are assembled to embrace the axle, provide a radial mounting face adapted to abut selectively either the inner or outer radial face of the hub; releasable means connectible between the members for securely though removably clamping the members together about the axle to constrain the members and axle for rotation together; and second releasable means connectible between the members and the hub for rigidly though removably securing the members selectively to either radial face of the hub.

10. For use with an agricultural tractor or like vehicle having a longitudinal body provided with a transverse, elongated axle which has an outer end spaced from the body and which further has an external keyway running lengthwise thereof: a wheel hub assembly, comprising a hub member having means thereon for carrying a wheel and further having a central opening providing a bearing surface by means of which the hub may be rotatably mounted on and axially shiftable relative to the axle selectively toward or away from the outer end of the axle, said hub having inner and outer radial mounting faces apart from the aforesaid wheel-carrying means; a pair of complementary, radially separable members of internally recessed form positionable selectively at either mounting face of the hub and constructed to embrace the axle, at least one of said members having an internal key receivable by and slidable lengthwise in the axle keyway, said members having radial portions which, when the members are assembled to embrace the axle, provide a radial mounting face adapted to abut selectively either the inner or outer radial face of the hub; releasable means connectible between the members for securely though removably clamping the members together about the axle to constrain the members and axle for rotation together; and second releasable means connectible between the members and the hub for rigidly though removably securing the members selectively to either radial face of the hub.

THEOPHILUS BROWN.
GEORGE ICKES.

References Cited in the file of this patent

UNITED STATES PATENTS

| Number | Name | Date |
|---|---|---|
| 1,519,236 | Bernier | Dec. 16, 1924 |
| 1,562,937 | Beardsley et al. | Nov. 24, 1925 |
| 1,656,935 | Bahan | Jan. 24, 1928 |
| 2,099,194 | Brown | Nov. 16, 1937 |
| 2,235,457 | Lorimor | Mar. 18, 1941 |
| 2,324,681 | Dekker | July 20, 1943 |
| 2,472,742 | Brown | June 7, 1949 |